United States Patent
Besnard et al.

(10) Patent No.: US 7,458,910 B2
(45) Date of Patent: Dec. 2, 2008

(54) POWER TRANSMISSION DEVICE AND PROCESS IMPLEMENTING SUCH DEVICE

(75) Inventors: Sebastien Besnard, Bourg la Reine (FR); Jacques Laeuffer, Paris (FR); Geraud Leneveu, Rueil-Malmaison (FR)

(73) Assignee: Peugeot Citroen Automobiles SA, Velizy-Villacoublay (FR)

( * ) Notice: Subject to any disclaimer, the term of this patent is extended or adjusted under 35 U.S.C. 154(b) by 425 days.

(21) Appl. No.: 10/595,218

(22) PCT Filed: Sep. 20, 2005

(86) PCT No.: PCT/FR2005/050765
§ 371 (c)(1),
(2), (4) Date: Apr. 10, 2006

(87) PCT Pub. No.: WO2006/032819
PCT Pub. Date: Mar. 30, 2006

(65) Prior Publication Data
US 2008/0234087 A1 Sep. 25, 2008

(30) Foreign Application Priority Data
Sep. 24, 2004 (FR) .................................. 04 52159

(51) Int. Cl.
*F16H 3/72* (2006.01)
(52) U.S. Cl. ......................................................... 475/5
(58) Field of Classification Search ...................... 475/5
See application file for complete search history.

(56) References Cited

U.S. PATENT DOCUMENTS

| 5,558,589 | A | 9/1996 | Schmidt | |
|---|---|---|---|---|
| 5,730,676 | A * | 3/1998 | Schmidt | 475/5 |
| 6,595,884 | B1 | 7/2003 | Ai et al. | |
| 6,793,600 | B2 * | 9/2004 | Hiraiwa | 475/5 |
| 7,252,614 | B2 * | 8/2007 | Raghavan et al. | 475/5 |
| 7,300,374 | B2 * | 11/2007 | Bucknor et al. | 475/5 |
| 2003/0100395 | A1 | 5/2003 | Hiraiwa | |
| 2005/0064974 | A1 | 3/2005 | Bezian et al. | |

FOREIGN PATENT DOCUMENTS

| EP | 0755818 A | 1/1997 |
|---|---|---|
| EP | 1097830 A | 5/2001 |
| FR | 2832357 A | 5/2003 |
| WO | WO 2004/044456 A | 5/2004 |

* cited by examiner

*Primary Examiner*—Ha D. Ho
(74) *Attorney, Agent, or Firm*—Nicolas E. Seckel

(57) ABSTRACT

A power transmission device (1) between a shaft (2) of a thermal engine (3) and a shaft (4) of wheels comprises a first and a second electric machine (6, 7), as well as a mechanical assembly (9). In a first mode of operation, the first machine (6) is connected to an element (27) of the assembly (9) and the second machine (7) is connected to a shaft (4) of the wheels (5). In a second mode of operation, the first machine (6) is connected to the element (27) of the assembly (9) and the second machine (7) is connected to another element (26) of the ensemble (9). In a third mode of operation, the shaft (10) of the first machine (6) is connected to the shaft (4) of the wheels (5) and the shaft (11) of the second machine (7) is connected to the other element (26).

16 Claims, 4 Drawing Sheets

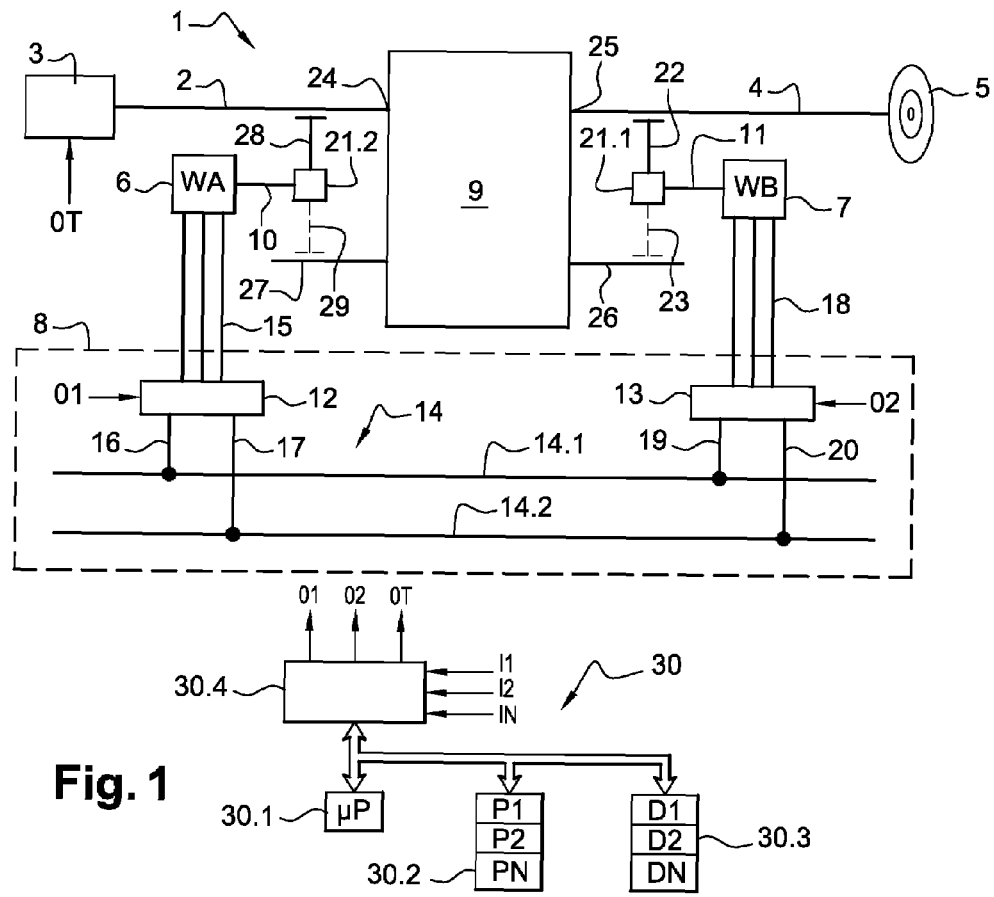
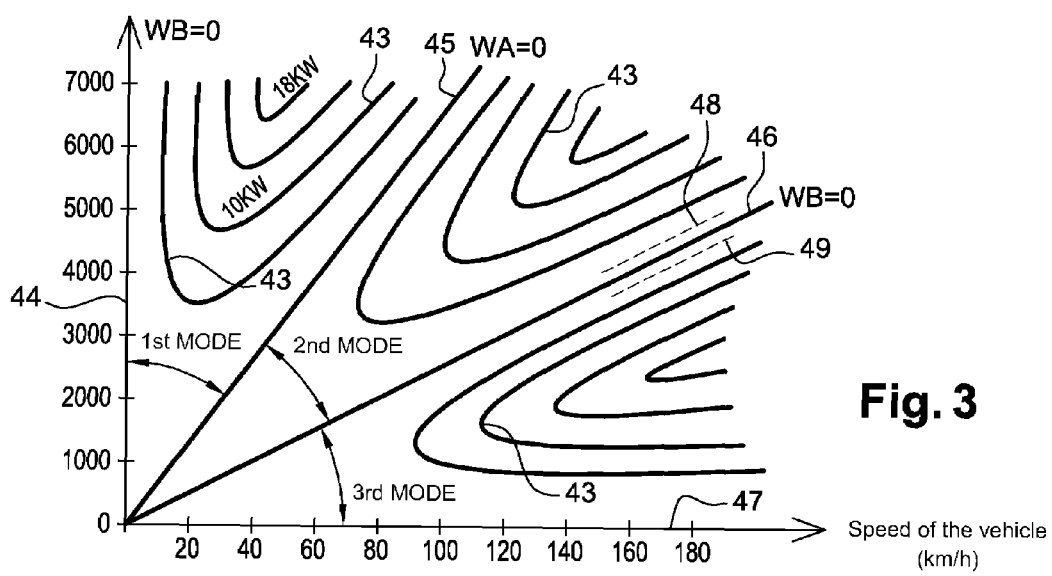
Fig. 1
Fig. 3

POWER TRANSMISSION DEVICE AND PROCESS IMPLEMENTING SUCH DEVICE

FIELD OF THE INVENTION

The present invention concerns a device for power transmission between a shaft of a thermal engine and a shaft of wheels of a vehicle. A goal of the invention is to eliminate torque ruptures or erasures at the wheel when gears are changed. The present invention has a particularly advantageous application in the field of motor vehicles, but it could also be implemented in trains, boats, or motorcycles.

BACKGROUND OF THE INVENTION

Devices for power transmission between a shaft of an engine and a shaft of wheels used in hybrid vehicles are known. Such devices are described in application FR-A-2832357. These transmission devices comprise generally a thermal engine, and a pair of electric machines. The shaft of the engine, the shaft of the wheels and the shafts of the machines are connected with each other through a mechanical assembly. This mechanical assembly is generally formed by one or several epicycloidal gear trains. The two machines are connected with each other through a connection device comprising in particular an electric bus. These machines behave as an engine or as a generator as a function of the mechanical and electrical energies that they receive on their shaft and on their terminals, respectively.

A power provided by the thermal engine can be, either transmitted directly to the shaft of the wheels through the mechanical assembly, or derived into an electric chain comprising the engines and the connection device. The power derived into the electric chain is transmitted to the shaft of the wheels so as to adjust the torque applied to this shaft, while adapting the torque and the speed of the thermal engine to a point of operation where consumption of this engine is minimal.

In a first configuration of the transmission device, no storage system is connected to the electric bus. In this configuration, the power in the electric chain is quasi null, apart from the losses of the electric machines. The power consumed by one of the machines is then automatically consumed by the other machine. As a consequence, when one machine behaves as an engine, the other machine behaves as a generator.

In a second configuration of the transmission device, a storing system is connected to the electric bus. This storing system can take the form of a battery, a super capacitor, or an inertia machine. A portion of the power derived can then be recuperated and stored in this storing system. The storing battery allows additional degrees of operation of the system. To this effect, the two machines can function simultaneously as engines in an acceleration mode. In addition, in a specific energy recuperation mode, the two machines can function simultaneously as generators, so as to store a high amount of energy.

SUMMARY OF THE INVENTION

The present invention consists in an improvement of the transmission device described in application FR-A-2832357.

In the transmission device described in this application, the shaft of one of the machines can be coupled to the shaft of the wheels of the vehicle. More precisely, in this transmission device, a shaft of one of the machines can be connected, either to the shaft of the wheels in a first mode of operation, or to an element of the mechanical assembly in a second mode of operation. Each mode of operation corresponds to a range of transmission ratios. The first mode corresponds to short transmission ratios, whereas the second mode corresponds to long transmission ratios.

Having two different modes of operation available in function of the situation in the life of the vehicle makes it possible to minimize the torque dimensioning of the two electric machines and to reduce the losses dissipated in these two machines. The electric machines used are thus of a smaller size than in a transmission device having a single mode of operation.

In the invention, in order to reduce even more the size of the electric machines and of the corresponding inverters, and also to save energy, a new mode of operation is introduced. More precisely, in the invention, besides being able to couple the shaft of one of the machines with the shaft of the wheels, it is possible to couple the shaft of the other machine with the shaft of the thermal engine.

Thus, in the invention, in a first mode of operation, the shaft of one of the machines is connected to an element of one of the epicycloidal gear trains whereas the shaft of the other machine is connected to the shaft of the wheels. In a second mode of operation, the shafts of the two machines are connected each to an element of one of the epicycloidal gear trains. In a third mode of operation, a shaft of one of the machines is connected to a shaft of the engine, whereas the shaft of the other machine is connected to an element of one of the epicycloidal gear trains.

In a particular embodiment, the mechanical assembly is formed by two epicycloidal gear trains connected with each other through their planet carriers. The shaft of one of the machines is connected, either to the shaft of the thermal engine, or to a ring gear of one of the epicycloidal gear trains. The shaft of the other machine is connected, either to the shaft of the wheels of the vehicle, or to a sun gear of the other epicycloidal gear train.

Thus, in the invention, one explores at its best the power dynamics of the thermal engine. This exploration of the torque and engine speed dynamics makes it possible to save a maximum of energy while letting the torque applied to the shaft of the wheels evolve in a manner as continuous as possible.

Preferably, when a mode is changed to another, the power transmitted by the electric chain is null, so as to manage more easily the continuity of the torque to the wheel.

Thus, the invention concerns a device for transmission of power between a shaft of a thermal engine and a shaft of wheels, comprising a first and a second electric machine, and
a mechanical assembly connecting with each other the shaft of the wheels, the shaft of the engine, and shafts of the two electric machines, this mechanical assembly being formed by at least two epicycloidal gear trains, these two epicycloidal gear trains comprising each several elements which mesh reciprocally,
characterized in that it comprises,
a switching device comprising means for connecting the shaft of the first machine, either to the shaft of the engine, or to an element of one of the gear trains of the mechanical assembly.

In addition, the invention concerns a process for the transmission of power between a shaft of an engine and a shaft of wheels implementing, two electric machines, and
a mechanical assembly connecting with each other shafts of the two electric engines, the shaft of the engine, and the shaft of the wheels, this mechanical assembly comprising at least two epicycloidal gear trains, these at least two epicycloidal gear trains comprising each three elements which mesh reciprocally, and in which the shaft of the first machine is connected to an element of one of the epicycloidal gear trains and the shaft of the second machine is connected to the shaft of the wheels, in a first mode of operation, the shaft of the first machine is connected to the element of one of the epicycloidal gear trains and the shaft of the second machine is connected to a second element of one of the epicycloidal gear trains, in a second mode of operation, characterized in that in a third mode of operation, the shaft of the first machine is connected to the shaft of the engine and the shaft of the second machine is connected to the other element.

The invention will be better understood by reading the following description and by examining the accompanying figures. These figures are provided for illustration purposes but do not limit the invention. These figures show:

BRIEF DESCRIPTION OF THE DRAWINGS

FIG. 1: a schematic view of a transmission device according to the invention;

FIG. 2b: an illustration of a first mode of operation of the transmission device of FIG. 2a;

FIG. 2c: an illustration of the second mode of operation of the transmission device of FIG. 2a;

FIG. 2d: an illustration of the third mode of operation of the transmission device of FIG. 2a;

FIG. 3: a chart view of the rotation speed of a shaft of the engine as a function of the speed of the vehicle;

DETAILED DESCRIPTION OF PARTICULAR EMBODIMENTS

Figure 2A:
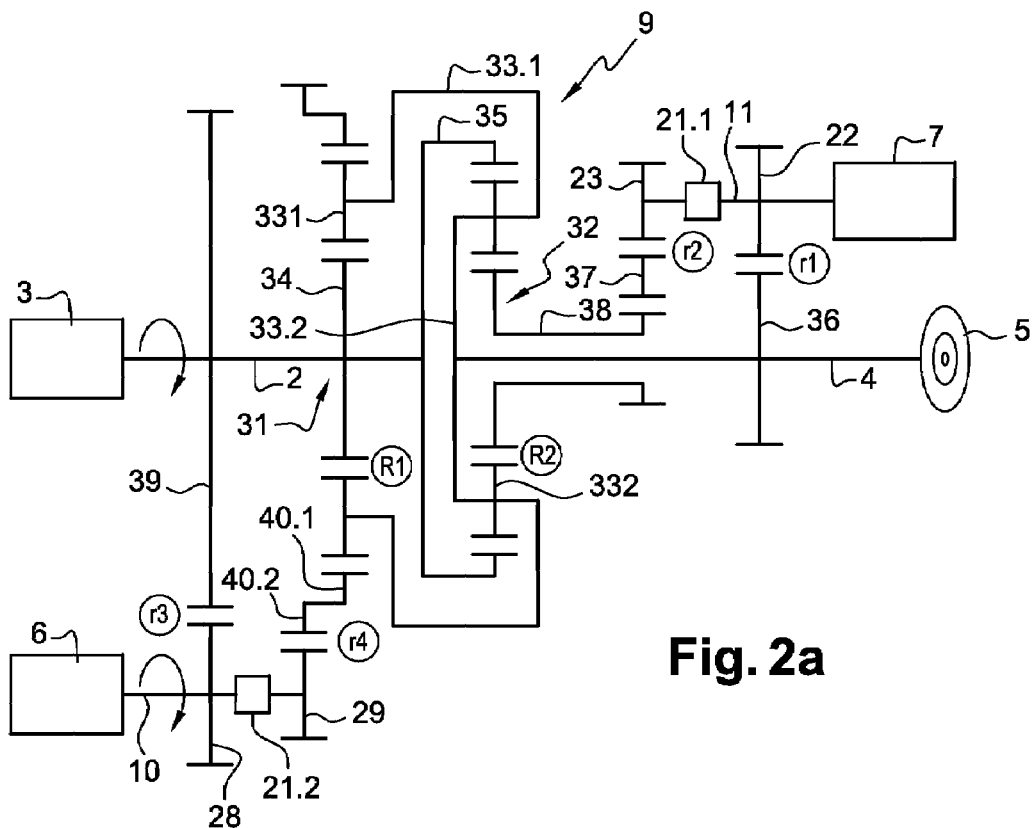
FIG. 2a: a schematic view of a transmission device according to the invention comprising a mechanical assembly formed by two epicycloidal gear trains.

FIG. 1 shows a schematic view of a power transmission device 1 according to the invention. The device 1 ensures a transmission of power between a shaft 2 of a thermal engine 3 and a shaft 4 of wheels 5.

This transmission device 1 comprises a first electric machine 6 and a second electric machine 7 connected with each other through an electrical connection device 8.

A mechanical assembly 9 connects with each other the shaft 4 of the wheels 5, the shaft 2 of the engine 3, a shaft 10 of the first machine 6 and a shaft 11 of the second machine 7. This mechanical assembly 9 comprises at least two epicycloidal gear trains. These two epicycloidal gear trains comprise each three elements which mesh reciprocally. These three elements are a ring gear, a planet carrier, and a sun gear. These two epicycloidal gear trains are connected with each other so as to offer four degrees of freedom, one for each shaft.

As a variant, the epicycloidal gear trains comprise more than three elements. For example, each gear train could comprise a ring gear with outside teeth which would mesh with a fourth element. As another example, each gear train would comprise several planet carriers. In addition, in some embodiments, the epicycloidal gear trains are connected with each other through gear shafts and pinions. In these embodiments, the pinions mesh with elements of the epicycloidal gear trains.

The shaft 2 of the engine 3 is connected to a first element 24 of the shafts of the assembly 9. The shaft 4 of the wheels 5 is connected to a second element 25 of one of the gear trains of the assembly 9. As explained below, the shaft 11 of the second machine 7 is connected, either to the shaft 2 of the engine 3, or to a third element 26 of one of the gear trains of the assembly 9. And the shaft 10 of the first machine 6 is connected, either to the shaft 4 of the wheels 5, or to a fourth element 27 of one of the gear trains of the assembly 9. Preferably, the first, the second, the third, and the fourth element 24-27 are four elements distinct from each other.

In addition, the connection device 8 comprises a first inverter 12 associated to the first machine 6 and a second inverter 13 associated to the second machine 7. The connection device 8 also comprises a DC voltage bus 14 which connects the two inverters 12 and 13. This bus 14 comprises a first connection 14.1 and a second connection 14.2. More precisely, phases 15 of the first machine 6 are connected to the inverter 12 which is itself connected to the bus 14 through two wire connections 16 and 17. Phases 18 of the second machine 7 are connected to the second inverter 13 which is itself connected to the bus 14 through two wire connections 19 and 20.

In such a transmission device 1, a power provided by the shaft 2 of the engine 3 can be transmitted directly to the shaft 4 of wheels 5 through a mechanical chain formed by the assembly 9. A portion of this power can also be derived by an electric chain which comprises the two machines 6 and 7 and the connection device 8.

When a power is derived into the electric chain, the machines 6 and 7 behave either as engines or as generators. In the configuration of the device 1 shown, no storage system is connected to the bus 14. When one of the machines functions as a generator, the other machine thus functions as an engine.

When one of the machines 6 or 7 functions as an engine, the inverter 12 or 13 which is associated thereto transforms a DC voltage signal observable on the bus 14 into AC and out-of-phase voltage signals. The transistors of the inverter 12 or 13 are then controlled into switching so as to chop the DC voltage observable on bus 14. The AC and out-of-phase voltage signals are applied to the terminals of the coils of the machine 6 or 7 which functions as an engine.

When one of the machines 6 or 7 functions as a generator, the inverter 12 or 13 which is associated thereto transforms the AC and out-of-phase voltage signals observable at the terminals of coils of the machine into DC voltage signals emitted on the bus 14. To this end, the transistors of the inverter 12 or 13 are blocked and the freewheeling diodes connected between an emitter and a collector of a transistor form a rectifier bridge.

In practice, the machines 6 and 7 are machines of the in-synch type. These machines have the advantage that they are compact and have a good efficiency.

The transmission device 1 comprises a first switching device 21.1. Depending on the mode of operation of the transmission device 1, this first switching device 21.1 connects the shaft 11 of the second machine 7, either to the shaft 4 of the wheels 5, or to the third element 26. More precisely, the first switching device 21.1 is capable of connecting the shaft 11 of the second machine 7 to the shaft 4 of the wheels 5 through a first gear 22. The first switching device 21 is also capable of connecting the shaft 11 of the second machine 7 to the third element 26 through a second gear 23.

In addition, in accordance with the invention, the transmission device 1 comprises a second switching device 21.2. According to the mode of operation of the device 1, this second switching device 21.2 makes it possible to connect the shaft 10 of the first machine 6, either to the shaft 2 of the engine 3, or to the fourth element 27. More precisely, this second switching device 21.2 is capable of connecting the shaft 10 of the first machine 6 to the shaft 2 of the engine 3 through a third gear 28. This second switching device 21.2 is also capable of connecting the shaft 10 of the first machine 6 to the fourth element 27 through a fourth gear 29.

Thus, in a first mode of operation, the shaft 10 of the first machine 6 is connected to the fourth element 27, whereas the shaft 11 of the second machine 7 is connected to the shaft 4 of the wheels 5. This first mode of operation is used for short transmission ratios, as will be seen on FIG. 3.

In a second mode of operation, the shaft 10 of the first machine 6 is connected to the fourth element 27, whereas the shaft 11 of the second machine 7 is connected to the third element 26. This second mode of operation is used for average speed ratios, as will be seen on FIG. 3.

In a third mode of operation, the shaft 10 of the first machine 6 is connected to the shaft 2 of the engine 3, whereas the shaft 11 of the second machine 7 is connected to the third element 26. This third mode of operation is used with long transmission ratios, as will be seen on FIG. 3.

The introduction of the second and third modes of operation makes it possible to limit the power derived into the electric chain. To this effect, the shafts 10 and 11 of machines 6 and 7 are always connected to the element that rotates the slowest, so as to limit the power transmitted by these machines. Thus, the shaft 11 of the second machine 7 is always connected to the element that rotates the slowest, between the shaft 4 of the wheels 5 and the third element 26. And the shaft 10 of the first machine 6 is always connected to the element that rotates the slowest, between the shaft 4 of the wheels 5 and the fourth element 27.

In an initial state, the transmission device 1 operates according to its first mode of operation. During the evolution of the speed of the vehicle, the transmission device 1 passes from a mode to another in a continuous manner. Thus, in the transmission device according to the invention, only one of the switching devices 21.1 and 21.2 shifts from one position to another when the mode is changed. With the transmission device 1 according to the invention, it is thus not possible to pass directly from the first to the third mode of operation, or the reverse. All other changes in modes can be envisioned.

In practice, to switch without difficulty from the first mode to the second mode of operation and reciprocally, ratios of the epicycloidal gear trains of the assembly 9 are chosen in a specific manner. More precisely, these ratios are chosen so that when the rotation speed of the shaft 4 of the wheels 5 is equal to the rotation speed of the third element 26 (apart from transmission reduction ratios), the rotation speed of the shaft 10 of the first machine 6 is null. The power transmitted by a machine being equal to its torque multiplied by its rotation speed, the power in the electric chain is null. Since the second machine 7 is rotating and its power is null, the torque applied to the shaft 11 of this second machine 7 is null. The first switching device 21.1 can thus pass without effort from meshing with the first gear 22 to meshing with the third gear 23, and reciprocally. In addition, the torque applied to the shaft 4 of the wheels 5 is equal globally to the sum of the torque applied to the shaft 2 of the engine 3 and the torque applied to the shaft 11 of the second machine 7. The passage from the first mode to the second mode is thus performed without any modification of the torque applied to the shaft 4 of the wheels 5.

In a similar way, in order to switch without difficulty from the second to the third mode and reciprocally, the ratios of the epicycloidal gear trains of the assembly 9 are chosen in a specific manner. More precisely, these ratios are chosen so that when the rotation speed of the shaft 2 of the engine 3 is equal to the rotation speed of the fourth element 27 (apart from transmission reduction ratios), the rotation speed of the shaft 11 of the second machine 7 is null. The power in the electric chain is null here also. Since the rotation speed of the first machine 6 is not null, but its power is null, the torque applied to its shaft 10 is null. The second switching device 21.2 can then pass without effort from meshing with the fourth gear 29 to meshing with the third gear 28, and reciprocally.

The passage from one mode to the other is done so that the engine 3 operates always at its optimal point of operation. This optimal point of operation corresponds, for a given power, to the engine speed at which the consumed power is minimal.

To this effect, the transmission device 1 comprises a control device 30. This control device comprises a microprocessor 30.1, a program memory 30.2, a data memory 30.3, and an input-output interface 30.4.

This data D1-DN corresponds to parameters of the transmission device 1, such as values of ratios of epicycloidal gear trains and values of gear ratios. Signals I1-IN are applied to the inputs of the input-output interface 30.4. These signals I1-IN correspond in particular to measurement signals and to order signals. These measurement signals are originated from sensors (not shown) located on the different organs of the device 1. These sensors emit in particular electrical signals corresponding to powers dissipated by the various machines and to rotation speeds of their shafts. The order signals correspond, for example, to a degree to which the accelerator pedal has been pushed down, to reference torques to be applied to shafts . . . .

As a function of the measurement and order signals received, the microprocessor 30.1 executes a program P1 taking into account a mapping of the speed of the engine 3 and of efficiencies of machines 6 and 7. As a function of values returned by this program P1, a mode of operation of the transmission device 1 is selected among the three modes of operation of the transmission device according to the invention. For example, if a minimum consumption is detected for a small transmission ratio, the first mode of operation will be selected. If a minimum consumption is detected for a high transmission ratio, it will be rather the second or the third mode which will be selected.

Control signals O1 and O2 are then emitted towards the inverters 12 and 13. These control signals O1 and O2 control the switching of the transistors of these inverters 12 and 13. This control of the transistors makes it possible to adapt the torque and the rotation speed of the shafts of the machines with respect to expected torque and rotation speed. In addition, a control signal OT is applied to an input of a module for control of the engine 3. This control signal OT controls the injection of fuel into the engine. The control signals O1, O2, and OT thus control the transmission device 1 so that the engine operates at its optimal point of operation and so that a torque applied to the shaft 4 of the wheels 5 of the vehicle corresponds to the torque requested by a user.

In order to switch from one mode to the other, switching conditions are verified by the control device 30. In an example, an input signal I2 corresponds to a rotation speed of the shaft 2 of the engine 3. An input signal I4 corresponds to a rotation speed of the shaft 4 of the wheels 5. An input signal I10 corresponds to a rotation speed of the shaft 10 of the first machine 6. An input signal I11 corresponds to the rotation speed of the shaft 11 of the second machine 7. An input signal I26 corresponds to a rotation speed of the third element I26 and an input signal I27 corresponds to a rotation speed of the fourth element 27.

When input signals I4 and I26 indicate that the rotation speeds of the shaft 4 of the wheels 5 and of the third element 26 are equal and input signal I2 indicates that the rotation speed of the shaft 2 is null, the microprocessor 30.1 executes a program P2. This program P2 causes the emission of a signal O3 which controls an electric engine of the second switching device 21.2. This engine moves the second switching device 21.2 from one position to another, so as to pass from the first to the second mode, or reciprocally.

Similarly, when the input signals I2 and I27 indicate that the rotation speeds of the shaft 2 of the engine 3 and of the fourth element 27 are equal, and the input signal I4 indicates that the rotation speed of the shaft 4 is null, the microprocessor 30.1 executes a program P3. This program P3 causes the emission of a signal O4 which controls an electric engine associated to the first switching device 21.1. This engine shifts the first switching device 21.1 from one position to another so as to pass from the second to the third mode, and reciprocally.

As a variant, a fourth mode of operation can be envisioned. In this fourth mode, the shaft 10 of the first machine 6 is connected to the shaft 2 of the engine 3 and the shaft 11 of the second machine 7 is connected to the shaft 4 of the wheels 5. However, this fourth mode has little interest. Indeed, the machine 6 and the machine 7 are in direct engagement with the shaft 2 of the engine 3 and the shaft 4 of the wheels 5, respectively. But this direct engagement of the machines 6 and 7 with the shafts 2 and 4 does not limit the power dissipated by these machines but, on the contrary, it increases it, which is not interesting from a point of view of consumption of the engine 3.

As a variant, a storage device, such as a battery and or super capacitor, is connected between the connections 14.1 and 14.2 of the DC voltage tension.

As a variant, the electrical connection device 8 comprises a triphase voltage bus and the inverters 12 and 13 are replaced by switches controlled by signals O1 and O2.

Figure 2B:
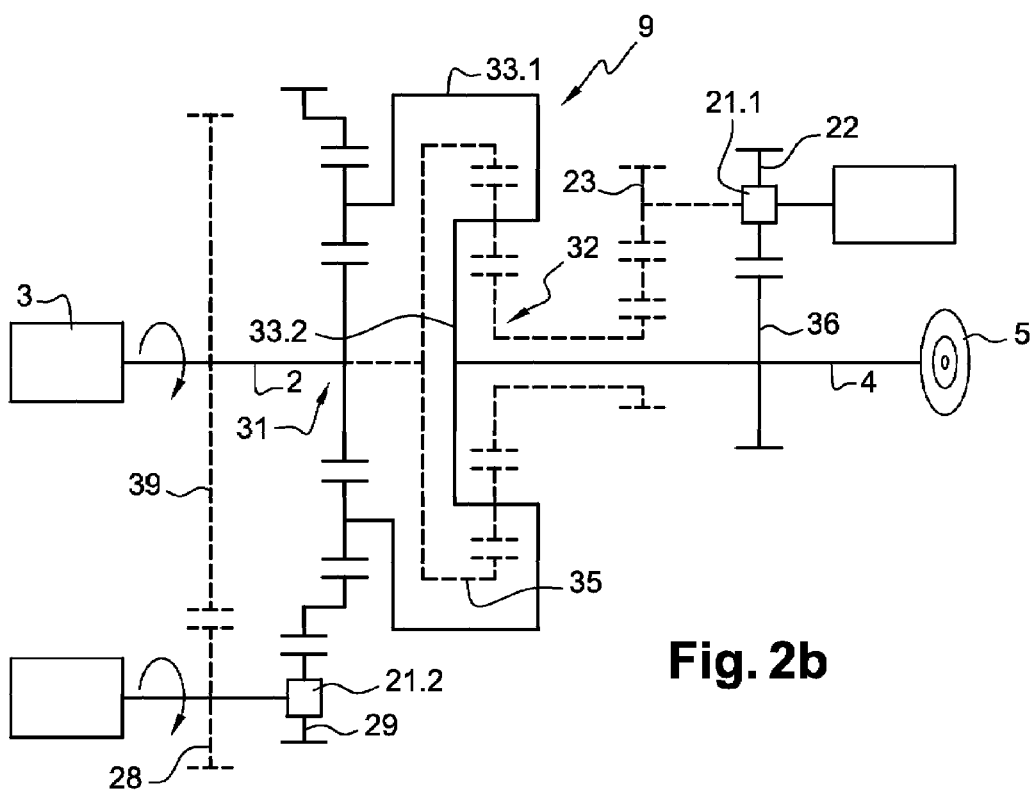
Figures 2C, 2D:
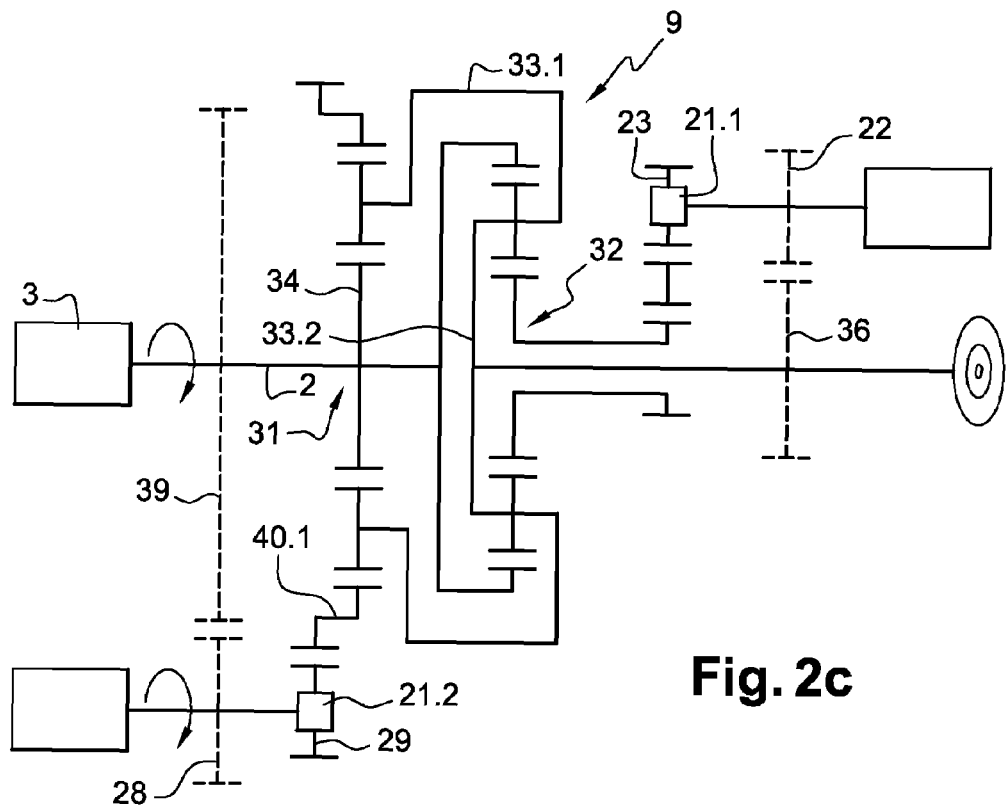

FIGS. 2*a*-2*d* show a schematic view of an exemplary embodiment of a transmission device 1 according to the invention. This transmission device 1 comprises two epicycloidal gear trains 31 and 32. FIGS. 2*b*-2*d* illustrates the three modes of operation of this transmission device 1. For more clarity in the Figures, the connection device 8 is not shown.

More precisely, FIG. 2 shows the mechanical assembly 9 which comprises a first epicycloidal gear train 31 and a second epicycloidal gear train 32. A planet carrier 33.1 of the first gear train 31 is connected to a planet carrier 33.2 of the second gear train 32. The satellites of the first gear train 31 are referenced 331. The satellites of the second gear train 32 are referenced 332. A sun gear 34 of the first gear train 31 is connected to a ring gear 35 of the second gear train 32.

The shaft 2 of the engine 3 is connected to the sun gear 34 of the first gear train 31. The shaft 4 of the wheels 5 is connected to the planet carrier 33.2 of the second train 32.

The shaft 11 of the second machine 7 is connected, either to the shaft 4 of the wheels 5, or to a sun gear 38 of the second gear train 31. More precisely, the shaft 11 of the second machine 7 is capable of being connected to the shaft 4 of the wheels 5, with the help of the first switching device 21.1, and through the first gear 22 and of a first wheel 36. A ratio r1 corresponds to the ratio between the diameter of this first gear 22 and of this first wheel 36. In addition, the shaft 11 of the first machine 6 is capable of being connected to the sun gear 38 of the second gear train 32, with the help of the first switching device 21.1, and through the second gear 23 and a second wheel 37. A ratio r2 corresponds to the ratio between the rotation speed of the sun gear 38 and that of the second gear 29.

The shaft 10 of the first machine 6 is connected, either to the shaft 2 of the engine 3, or to a ring gear 40.1 of the first gear train 31. More precisely, the shaft 10 of the first machine 6 is capable of being connected to the shaft 2 of the engine 3, with the help of the second switching device 21.2, and through the third gear 28 and a third wheel 39. A ratio r3 corresponds to a ratio between the diameter of this third gear 28 and of this third wheel 39. In addition, the shaft 10 of the first machine 6 is capable of being connected to the ring gear 40.1 of the first gear train 31, with the help of the second switching device 21.2, and through the fourth gear 29 and a fourth wheel 40.2. A ratio r4 corresponds to the ratio between the diameter of this fourth gear 29 and of this fourth wheel 37.

In this embodiment, the first element 24 of FIG. 1 corresponds to the sun gear 34 of the first gear train 31. The second element 25 of FIG. 1 corresponds to the planet carrier 33.2 of the second gear train 32. The third element 26 of FIG. 1 corresponds to the sun gear 38 of the second gear train 32. The fourth element 27 corresponds to the ring gear 40.1 of the first gear train 31.

The ratio of an epicycloidal gear train corresponds to the ratio between the diameter of its ring gear and the diameter of its sun gear. In a particular embodiment, the ratio R1 of the first gear train 31 has a value of 2.3. The ratio R2 of the second gear train 32 has a value of 3.789. The first ratio r1 has a value of −0.23. The second ratio r2 has a value of 1.18. The third ratio r3 is lower than the fourth ratio r4 which has a value of −0.45. The sign − indicates that the wheels turn in opposite directions with respect to each other.

FIG. 2*b* illustrates the first mode of operation of the transmission device 1 of FIG. 2*a*.

In this first mode, the first switching device 21.1 is connected to the first gear 22 and the second switching device is connected to the fourth gear 29. Thus, the first gear 22 is driven in rotation by the first switching device 21.1, whereas the second gear 23 is not driven in rotation. In addition, the fourth gear 29 is driven in rotation by the second switching device 21.2, whereas the third gear 28 is not driven in rotation.

No power can thus be transmitted through the second gear 23 and the third gear 28. The third gear 28 and the third wheel 39 are thus represented in dotted line to illustrate the fact that they do not transmit any power to the shaft 4 of the wheels 5. The second epicycloidal gear train 32 is also represented in dotted line. Indeed, even if the ring gear 35 of the second gear train 32 is driven in rotation, it does not transmit any power to the shaft 4 of the wheels 5, since it is not connected to that shaft 4.

In this first mode, the second machine 7 transmits its power to the shaft 4 of wheels 5 through the first gear 22 and the first wheel 36. In addition, the thermal engine provides its power to the shaft 4 of the wheels 5 through the first gear train 31. In this first mode, the rotation speed of the shaft 4 of the wheels 5 is equal to the rotation speed of the planet carriers 33.1 and 33.2.

When the vehicle is in a traction phase, i.e., when the shaft 2 of the engine 3 provides power to the shaft 4 of the wheels 5, the first machine 6 behaves as a generator, whereas the second machine 7 behaves as an engine. When the vehicle is in a recuperation phase, i.e., when the shaft 2 of the engine 3 is driven in rotation by the shaft of the wheels 5, the first machine 6 behaves as an engine, whereas the second machine behaves as a generator. The behavior of the machines in the various phases is valid in all the modes of operation of the transmission device 1 according to the invention.

FIG. 2c illustrates the second mode of operation of the transmission device 1 according to the invention.

The shaft 2 of the thermal engine 3 is always connected to the sun gear 34 of the first gear train 31. The shaft 4 of the wheels 5 is always connected to the planet carrier 33.2 of the second gear train 32.

In this second mode of operation, the first switching device 21.1 is connected to the second gear 23 and the second switching device 21.2 is connected to the fourth gear 29. Thus, the second gear 23 is driven in rotation by the first switching device 21.1, whereas the first gear 22 is not driven in rotation. In addition, the fourth gear 29 is driven in rotation by the second switching device 21.2, whereas the third gear 28 is not driven in rotation.

As a consequence, the first gear 22 and the first wheel 36 are shown in dotted line, as well as the fourth gear 29 and the fourth wheel 39. This representation in dotted line illustrates the fact that they do not transmit power to the shaft 4 of the wheels 5.

In this second mode, the exchanges of power among the shafts of the machines 6 and 7, the shaft 2 of the engine 3, and the shaft 4 of the wheels 5 are done through the two gear trains 31 and 32.

FIG. 2d illustrates the third mode of operation of the transmission device 1 according to the invention.

The shaft 2 of the thermal engine 3 is always connected to the sun gear 34 of the first gear train 31. The shaft 4 of the wheels 5 is always connected to the planet carrier 33.2 of the second gear train 32.

In this third mode of operation, the first switching device 21.1 is connected to the second gear 23, and the second switching device 21.2 is connected to the third gear 28. The second gear 23 is thus driven in rotation by the first switching device 21.1, whereas the first gear 22 is not driven in rotation. In addition, the third gear 28 is driven in rotation by the second switching device 21.2, whereas the fourth gear 29 is not driven in rotation.

As a consequence, the first gear 22 and the first wheel 36 shown in dotted line cannot transmit power to the shaft 4 of the wheels 5. The first gear train 31 is also shown in dotted line to illustrate the fact that it does not transmit power to the shaft 4 of the wheels 5 either. Indeed, the ring gear 40.1 of this first gear train 31 is driven in rotation, but it is not connected to the shaft of the second machine 7.

In this third mode, the exchanges of power among the shafts of the machines 6 and 7, the shaft 2 of the engine 3, and the shaft 4 of the wheels 5 are done through the third gear 28 and the third wheel 39, as well as through the second gear train 32.

FIG. 3 shows curves 43 representing a rotation speed of the shaft 2 of the engine 3 in revolutions per minute, as a function of a speed of the vehicle in kilometers per hour.

These curves 43 are located in three different zones. Each zone is limited by two straight lines, called adaptation straight lines. These adaptation straight lines correspond to transmission reductions for which the power derived into the electric chain is null. Each zone corresponds to a mode of operation of the transmission device 1 according to the invention. Indeed, two adaptation straight lines are associated to each mode.

Thus, a first adaptation straight line 44 and a second adaptation straight line 45 are associated to a first mode of operation of the transmission device 1. This first mode of operation is used for low transmission ratios. This first mode is implemented in particular when the vehicle is started or when the vehicle has a speed comprised between 0 and 15 km/h, for a rotation speed of the shaft of the thermal engine of 1000 revs/min. This first mode is also implemented for when the vehicle is moving in reverse.

The second adaptation straight line and a third adaptation straight line 46 are associated to the second mode of operation. This second mode is implemented for average transmission ratios.

The third adaptation straight line 46 and a fourth adaptation straight line 47 are associated to the third mode of operation. This third mode is implemented for longer transmission ratios than those implemented in the second mode.

The second and the third mode are implemented after the vehicle has been started, when it is moving forward.

To each curve 43 corresponds a power derived into the electric chain. The more one moves away from the adaptation straight lines, the more the derived power increases. On the contrary, the closer one comes to the adaptation straight lines, the more the power derived into the electric chain diminishes. In a particular embodiment, one of the curves 43 close to the adaptation straight lines of a zone corresponds to a derived power of 10 KW, whereas another curve farther away from the adaptation straight lines corresponds to a power derived into the electric chain of 18 KW.

For each straight line, a rotation speed of a shaft of one of the machines 6 or 7 is null. More precisely, on the second adaptation straight line 45, the rotation speed WA of the shaft 10 of the first machine 6 is null. On the third adaptation straight line 46, the rotation speed WB of the shaft 11 of the second machine 7 is null. Thus, when one is located on an adaptation straight line, the power derived into the electric chain is null. When one is located on an adaptation straight line, the power of the engine 2 is thus transmitted directly by a mechanical path to the shaft 4 of the wheels 5. Each adaptation straight line thus corresponds to a transmission reduction ratio between the rotation speed of the shaft 2 of the engine 3 and a rotation speed of the shaft 4 of the wheels 5.

The passage from one mode to another makes it possible to reduce a stress applied to the shafts 10 and 11 of the machines 6 and 7 in the vicinity of their maximal speed. To this effect, in the first mode, the second machine 7 is in direct engagement with the shaft 4 of the wheels 5. The rotation speed WB of the shaft 11 of this second machine 7 thus increases very quickly proportionally to the speed of this shaft 4 of the wheels 5. On the second adaptation straight line 45, if the engine 3 is itself at its maximal speed, the rotation speed WB of the shaft 11 of the second machine 7 reaches its maximal speed. In all cases, on the second adaptation straight line 45, the rotation speed WA of the shaft 10 of the first machine 6 is null. If the speed of the vehicle increases, one passes then into the second mode of operation.

In this second mode, when the speed of the vehicle increases, the rotation speed WB of the shaft 11 of the second machine 7 diminishes, whereas the rotation speed WA of the shaft 10 of the first machine 6 increases. On the third adaptation straight line 46, the rotation speed WB of the shaft 11 of the second machine 7 is then null, whereas the rotation speed WA of the shaft 10 of the first machine 6 can be close to its maximal speed. If the speed of the vehicle increases even more, the transmission device 1 passes into the third mode of operation.

In this third mode, the rotation speed WA of the shaft 10 of the first machine 6 and the rotation speed WB of the shaft 11 of the second machine 7 are lower then their maximal speeds.

The transmission device 1 according to the invention makes it possible to limit the power transmitted by the electric chain to 12 kilowatts. Whereas, for existing devices having only one mode of operation, the machines transmit about four times more power, and, for existing devices having only two modes of operation, the machines transmit a power in the order of 18 kilowatts. The machines used in the device according to the invention are thus more compact than the machines of the devices according to the state of the art.

Preferably, as has been observed, the control device 30 drives the changes in modes on the adaptation straight lines, when the power derived into the electric chain is null. This change in mode on the adaptation straight lines makes it possible to shift the switching device 21.1 or 21.2 from one position to another without effort. Indeed, the torque which is applied to the shaft along which the switching device 21.1 or 21.2 moves is then null.

As a variant, the control device 30 drives changes in modes on straight lines different from the adaptation straight lines, such as the straight line 48 or the straight line 49. These straight lines 48 and 49 are shown in dotted line. The control device 30 then emits control signals O1 and O2 towards the inverters 12 and 13 associated to the machines 6 and 7, so as to compensate a difference in rotation speeds which exists between the shaft of the machine 6 or 7 and an element to be connected. In this variant, in order to increase the speed of the shaft of the machine, additional power is provided to the machine 6 or 7 through a storage system. This storage system, such as a battery or a super capacitor, is connected on an electric bus that connects the two machines.

Figure 4A:
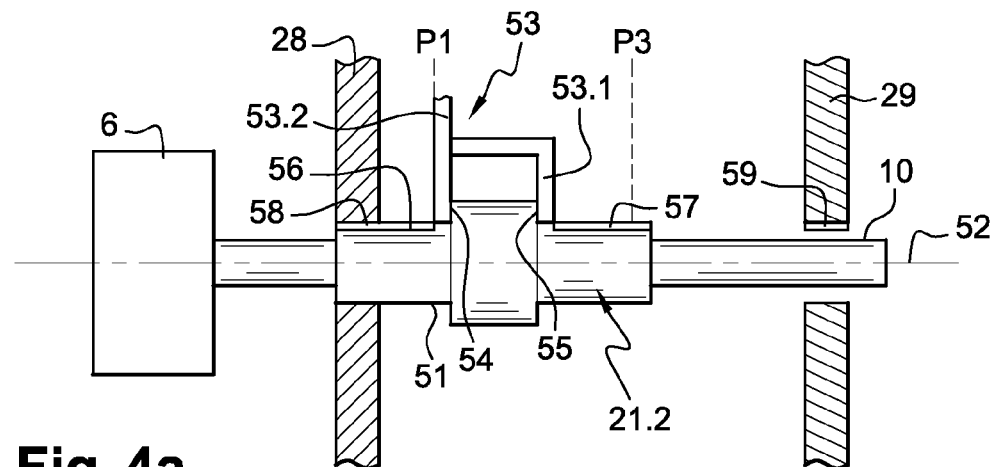
FIGS. 4a-4c: a schematic view of a displacement of a switching device when a mode is changed to another.
Figure 4B:
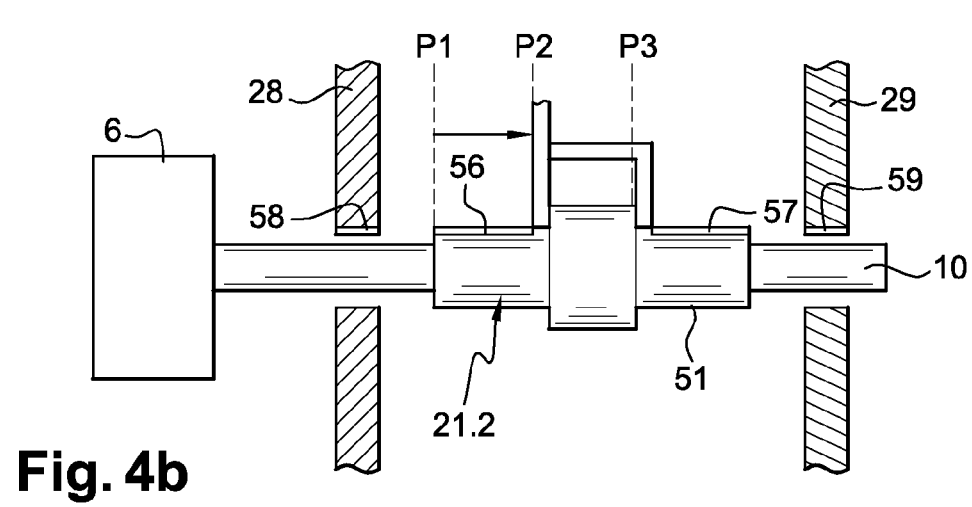
Figure 4C:
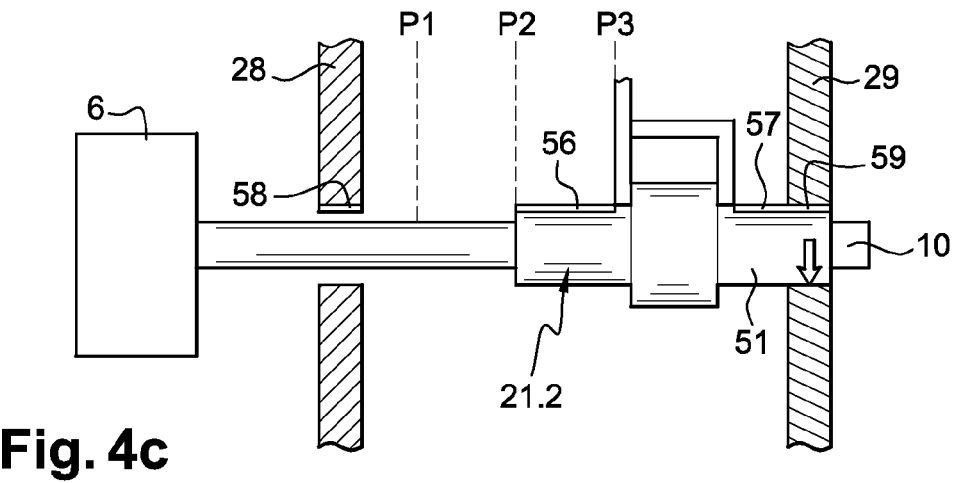

FIGS. 4a-4c show steps in the displacement of a second switching device 21.2. This second switching device 21.2 makes it possible for the shaft of the first machine 6 to mesh, either with the third gear 28, or with the fourth gear 29.

The switching device 21.2 comprises a sliding sleeve 51 and a fork 53. The sliding sleeve 51 moves along the shaft 10 of the first machine 6, which has a rotation axis 52. The fork 53 is coupled to the sliding sleeve 51. More precisely, this fork 53 has two arms 53.1 and 53.2 which are supported on shoulders 54 and 55 of the sliding sleeve 51. This fork 53 is moved with the help of a DC current motor. A movement in rotation of this motor is controlled by the signal O3 emitted by the control device 30.

On FIG. 4a, the sliding sleeve 51 is located in a first position P1. In this first position P1, the sliding sleeve 51 is engaged with the third gear 28. The fourth gear 29 is not driven in rotation.

On FIG. 4b, the fork 53 moves the sliding sleeve 51 from the first position toward a second position P2. During this displacement, the sliding sleeve 51 is disengaged from the first gear 28. In this position, the sliding sleeve 51 is not engaged, either with the third gear 28, not with the fourth gear 29.

On FIG. 4c, the fork 53 moves the sliding sleeve 51 from the second position P2 toward a third position P3. During this displacement, the sliding sleeve 51 becomes engaged into the fourth gear 29. In this third position P3, the sliding sleeve 51 is engaged with the fourth gear 29 so as to make it possible to drive it in rotation. The third gear 28 is not driven in rotation.

In a particular embodiment, the sliding sleeve 51 comprises tongues 56 and 57 oriented axially with respect to the axis 52. The gears 28 and 29 comprise a groove 58 and a groove 59, respectively, on their peripheries. These grooves 58 and 59 are oriented axially with respect to the axis 52. These grooves 58 and 59 are intended to receive the tongues 56 and 57, so that the sliding sleeve 51 can drive the gears 28 and 29 in rotation.

As a variant, the sliding sleeve 51 has teeth that come into cooperation with teeth of the gears 28 and 29 located on the peripheries of their interior diameters.

Of course, the movement of the sliding sleeve 51 is reversible. Indeed, the sliding sleeve 51 can also pass from being coupled with the fourth gear 29 to being coupled with the third gear 28.

In order for the passage from a position to another to occur without effort, when the rotation speeds of the gears 28 and 29 are equal, the rotation speed of the shaft 11 of the second machine 7 is null. Of course, because of its inertia, the rotation speed of the shaft 10 of the first machine 6 is also equal to the rotation speeds of the gears 28 and 29 at a time of switching. These conditions make it possible to annul the torque that can be observed on the shaft 10 of the first machine 6, even though it is rotating.

However, in practice, a power corresponding to losses of the electric machines 6 and 7 must be dissipated, even at a time of switching. At a time of switching from the second to the third mode, the first machine 6 is then controlled, so that a slight torque can be observed on its shaft 10. The combination of the rotation speed of its shaft 10 and of the torque that can be observed on this shaft causes a power that corresponds to the losses of the electric machines 6 and 7. The same happens with the shaft 11 of the second machine 7 at a time of switching from the first to the second mode, and reciprocally.

An interest of the sliding sleeve 51 is that it dissipates very little energy. As a variant, the switching device used is a clutch.

The first switching device 21.1 is made in the same manner as the switching device 21.2 just described.

The invention claimed is:

1. Device for a transmission of power between a shaft of a thermal engine and a shaft of wheels, comprising:
    a first and a second electric machine, and
    a mechanical assembly connecting with each other the shaft of the wheels, the shaft of the engine, and shafts of the two electric machines, the mechanical assembly being formed by at least two epicycloidal gear trains, the two epicycloidal gear trains comprising each several elements which mesh reciprocally,
    wherein it comprises,
    a switching device comprising means for connecting the shaft of the first machine, either (1) to the shaft of the engine and not to any element of the gear trains of the mechanical assembly, or to an element of one of the gear trains of the mechanical assembly.

2. Device according to claim 1 wherein
    the mechanical assembly is formed by a first and a second epicycloidal gear train, the first and second epicycloidal gear trains being connected with each other through their planet carriers, a sun gear of the first gear train being connected to a ring gear of the second gear train.

3. Device according to claim 2 wherein
    the switching device comprises means for connecting the shaft of the first machine, either to the shaft of the engine, or to the ring gear of the first epicycloidal gear train.

4. Device according to claim 1 wherein
    the ratios of the epicycloidal gear trains are chosen so that, when the rotation speed of the element of one of the gear trains to which the switching device is capable of being connected is equal to the rotation speed of the shaft of the engine, the rotation speed of the shaft of the second machine is null.

5. Device according to claim 1 which comprises a control device that drives the thermal engine, both electric machines, and the switching device.

6. Device according to claim 1 wherein
    the switching device comprises a sliding sleeve and a fork.

7. Device according to claim 1 which comprises an electrical connection device which connects the electric machines with each other.

8. Device according to claim 7 wherein
the electrical connection device comprises a DC voltage bus and two inverters each connected to one of the electric machines and to the bus.

9. Device according to claim 8 which comprises a battery connected to the bus.

10. Device according to claim 1 which comprises another switching device comprising means for connecting the shaft of the second machine, either to the shaft of the wheels, or to an element of one of the gear trains of the mechanical assembly.

11. Process for a transmission of power between a shaft of an engine and a shaft of wheels implementing,
two electric machines, and
a mechanical assembly connecting with each other shafts of the two electric machines, the shaft of the engine, and the shaft of the wheels, the mechanical assembly comprising at least two epicycloids gear trains, the at least two epicycloidal gear trains comprising each three element which mesh reciprocally, and in which:
the shaft of the first machine is connected to an element of one of the epicycloidal gear trains and the shaft of the second machine is connected to the shaft of the wheels, in a first mode of operation,
the shaft of the first machine is connected to the element of one of the epicycloidal gear trains and the shaft of the second machine is connected to another element of one of the epicycloidal gear trains, in a second mode of operation,
wherein
in a third mode of operation, the shaft of the first machine is connected directly to the shaft of the engine and the shaft of the second machine is connected to said another element.

12. Process according to claim 11 wherein
one passes from the first mode of operation to the second mode of operation when the rotation speed of the shaft of the wheels is equal to the rotation speed of the element of the assembly to which the first switching device is capable of being connected.

13. Process according to claim 12 wherein
the rotation speed of the shaft of the first machine is null.

14. Process according to claim 11 wherein
one passes from the second mode of operation to the third mode of operation when the rotation speed of the shaft of the engine is equal to the rotation speed of the element of the assembly to which the second switching device is capable of being connected.

15. Process according to claim 14 wherein
the rotation speed of the shaft of the second machine is null.

16. Process according to claim 11 wherein
both electric machines are driven to compensate a difference in speeds between the shaft of one of the machines and the element to be connected at a time of passing from one mode to another, with the help of a control device.

* * * * *